United States Patent
Shibilia et al.

(10) Patent No.: US 9,929,555 B2
(45) Date of Patent: *Mar. 27, 2018

(54) WEDGE DEAD END CLAMP ASSEMBLY

(71) Applicant: Hubbell Incorporated, Shelton, CT (US)

(72) Inventors: David J. Shibilia, Pell City, AL (US); Paul F. Zelazny, Canton, MI (US)

(73) Assignee: Hubbell Incorporated, Shelton, CT (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/665,924

(22) Filed: Mar. 23, 2015

(65) Prior Publication Data
US 2015/0200527 A1  Jul. 16, 2015

Related U.S. Application Data

(63) Continuation of application No. 13/359,700, filed on Jan. 27, 2012, now Pat. No. 8,984,722.

(60) Provisional application No. 61/445,773, filed on Feb. 23, 2011.

(51) Int. Cl.
*H02G 7/05* (2006.01)
*H02G 7/02* (2006.01)

(52) U.S. Cl.
CPC .............. *H02G 7/056* (2013.01); *H02G 7/02* (2013.01); *Y10T 24/3969* (2015.01); *Y10T 24/4453* (2015.01); *Y10T 29/49863* (2015.01)

(58) Field of Classification Search
CPC . H02G 7/056; H02G 7/02; H02G 7/08; Y10T 24/4453; Y10T 24/3969; Y10T 24/49863; H01R 4/5083; F16G 11/046; F16G 11/048

See application file for complete search history.

(56) References Cited

U.S. PATENT DOCUMENTS

| | | | |
|---|---|---|---|
| 1,080,472 A | | 12/1913 | Parker et al. |
| 1,504,087 A | * | 8/1924 | Brady ............... E21B 19/12 24/136 R |
| 2,146,575 A | | 2/1939 | Hefftner |
| 2,220,203 A | * | 11/1940 | Branin ............... F16G 11/106 24/136 R |
| 4,407,471 A | | 10/1983 | Wilmsmann et al. |
| 5,358,206 A | | 10/1994 | Pittella |
| 5,369,849 A | | 12/1994 | DeFrance |
| 5,539,961 A | | 7/1996 | DeFrance |
| 5,615,965 A | | 4/1997 | Saurat et al. |

(Continued)

*Primary Examiner* — Robert Sandy
*Assistant Examiner* — Matthew J Sullivan
(74) *Attorney, Agent, or Firm* — Michael Best & Friedrich, LLP

(57) ABSTRACT

A clamp assembly includes a body having a base and first and second jaw guides extending outwardly from the base. A trough has first and second ends formed between the first and second jaw guides. First and second jaws are movably received in the trough for receiving a cable therebetween. The first jaw engages the first jaw guide. The second jaw engages the second jaw guide. The first jaw engages the second jaw such that the first and second jaws move together. A pin is disposed in the body proximal the first end of the trough. A spring has a first end connected to the pin and a second end connected to the second jaw to bias the first and second jaws toward the first end of the trough.

20 Claims, 11 Drawing Sheets

(56) References Cited

U.S. PATENT DOCUMENTS

| | | | |
|---|---|---|---|
| 5,647,046 A | | 7/1997 | Cowen et al. |
| 6,076,236 A | * | 6/2000 | DeFrance ............. F16G 11/048 |
| | | | 24/132 WL |
| 6,389,213 B1 | | 5/2002 | Quesnel |
| 6,547,481 B2 | | 4/2003 | Grabenstetter et al. |
| 6,796,854 B2 | | 9/2004 | Mello et al. |
| 6,817,909 B2 | * | 11/2004 | Dobrinski ................ H01R 4/52 |
| | | | 439/783 |
| 6,957,807 B2 | | 10/2005 | Zimmer et al. |
| 7,039,988 B2 | * | 5/2006 | De France ............ H02G 7/056 |
| | | | 24/115 M |
| 7,304,243 B2 | | 12/2007 | Polidori |
| 7,891,060 B2 | | 2/2011 | Ross et al. |
| 8,336,684 B2 | | 12/2012 | Bantle et al. |
| 8,984,722 B2 | * | 3/2015 | Shibilia .................. H02G 7/056 |
| | | | 24/136 R |
| 2002/0173206 A1 | * | 11/2002 | Dobrinski ................ H01R 4/52 |
| | | | 439/786 |
| 2006/0009086 A1 | * | 1/2006 | Stanton ................ H01R 4/5091 |
| | | | 439/783 |

\* cited by examiner

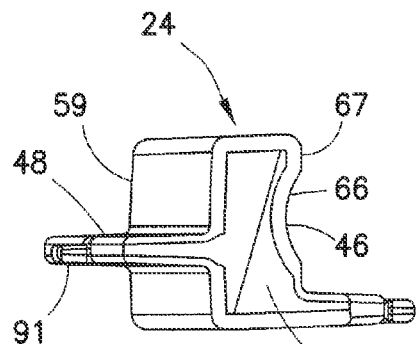
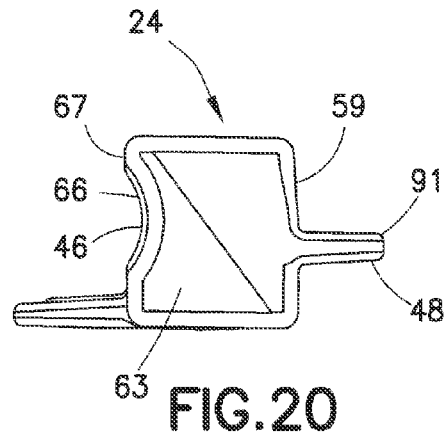
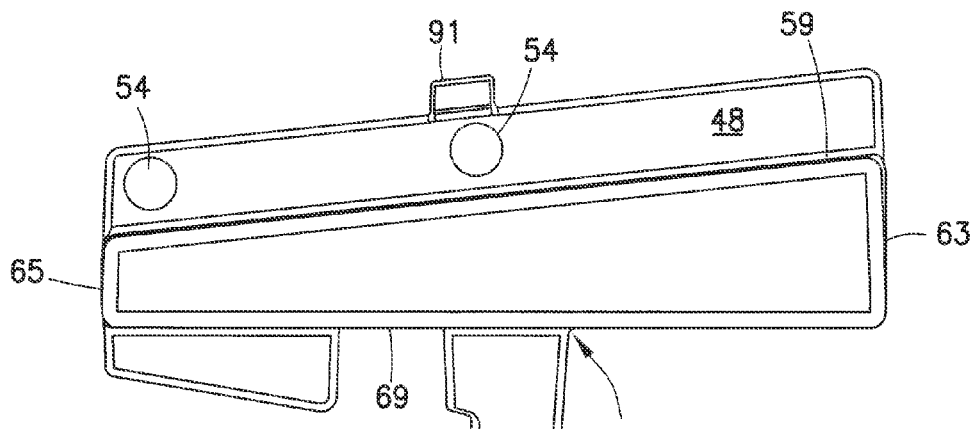
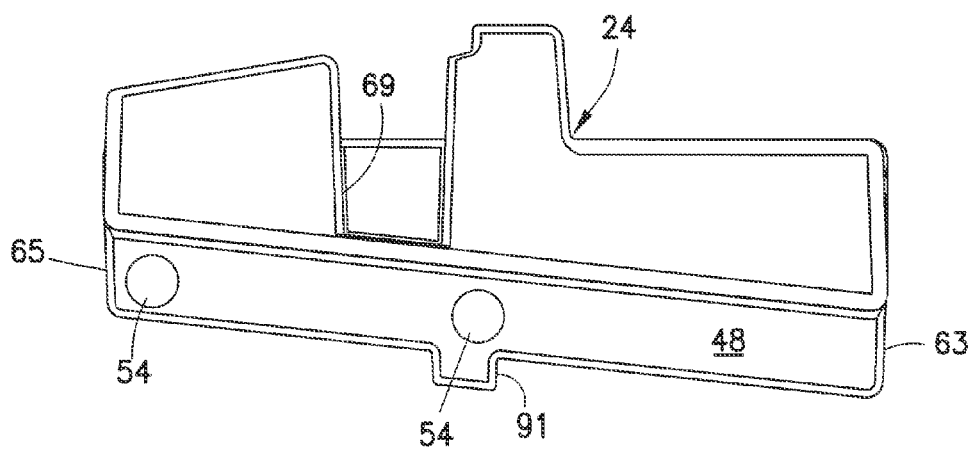

WEDGE DEAD END CLAMP ASSEMBLY

CROSS-REFERENCE TO RELATED APPLICATION

This application is a continuation of U.S. patent application Ser. No. 13/359,700, filed on Jan. 27, 2012, which claims priority to U.S. Provisional Application Ser. No. 61/445,773, filed Feb. 23, 2011, the disclosures of which are hereby incorporated by reference in their entirety.

FIELD OF THE INVENTION

The present invention relates to a dead end clamp or tension device for attaching a cable to a support through an insulator device. More particularly, the present invention relates to a dead end clamp assembly that receives cables of various sizes. Still more particularly, the present invention relates to a wedge dead end clamp assembly in which the jaws are prevented from accidentally exiting a body of the clamp assembly.

BACKGROUND OF THE INVENTION

Conventional dead ends anchor electrical transmission lines to supporting structures, such as towers or poles. Dead ends include a mechanism for gripping a cable or conductor so that tension on the line is delivered through the insulated mount to the tower or pole. Conventional dead ends often include clamps compressed together by nuts and bolts, but the effectiveness thereof decreases over time as over-tightening of the nuts and bolts can cause metal fatigue and, eventually, failure.

Some conventional dead ends include spring loaded wedge-shaped jaws for gripping cables or conductors. Though this is an improvement over the dead ends comprising clamps compressed together by nuts and bolts, the spring loaded dead ends have problems with their interlock features.

A need exists for a dead end clamp configured to attach a cable or a power conductor to a power pole through an insulator device with a single body jaw guide and a streamlined locking mechanism to prevent the jaws from sliding out of the jaw guide.

SUMMARY OF THE INVENTION

Accordingly, an object of the invention is to provide a wedge dead end clamp assembly having a single body with first and second jaws and first and second jaw guides and an interlock feature having at least one ball bearing received in each of the jaw guides to lock the respective jaws in the jaw guides.

Another object of the invention is to provide openings along the upper surface of the jaw guides for assembling the ball bearings and receiving pins to secure the ball bearings in the jaw guides.

A further object of the invention is to provide a wedge dead end clamp assembly having a fin along the exterior surface of a jaw for engaging a corresponding groove along the interior surface of the corresponding jaw guide.

Still another object of the invention is to provide a wedge dead end clamp assembly having a pullback mechanism characterized by a fin disposed on its upper surface and a ball to improve the user's grip on the fin.

Yet another object of the invention is to provide a wedge dead end clamp assembly having a sag eye large enough to accommodate large ton industry hooks of various sizes.

Another object of the invention is to provide a key-shaped notch adjacent one of the jaw guides for receiving a spring therein.

A further object of the invention is to provide a supplemental opening along the upper surface of the second jaw guide, offset from the first opening, to receive a pin adjacent the spring for anchoring the pull spring.

The device can accommodate a large range of cables because the first and second jaws are angled toward the end of the clamp. The dead end clamp assembly includes an interlock feature for securing the jaws at the front end of the clamp. By forming the wedge dead end clamp assembly in this manner, the wedge dead end clamp assembly can be used for accommodating a large range of cables attached to power poles while also providing a secure tool for the user with enhanced gripping features.

The foregoing objectives are basically attained by a clamp assembly having a body having a base and first and second jaw guides extending outwardly from the base. A trough has first and second ends formed between the first and second jaw guides. First and second jaws are movably received in the trough for receiving a cable therebetween. The first jaw engages the first jaw guide. The second jaw engages the second jaw guide. The first jaw engages the second jaw such that the first and second jaws move together. A pin is disposed in the body proximal the first end of the trough. A spring has a first end connected to the pin and a second end connected to the second jaw to bias the first and second jaws toward the first end of the trough.

As used in this application, the terms "front", "rear", "side" and other orientational descriptors are intended to facilitate the description of the wedge dead end clamp assembly, and are not intended to limit the structure of the wedge dead end clamp assembly to any particular position or orientation.

Other objects, advantages, and salient features of the present invention will become apparent from the following detailed description, which, taken in conjunction with the annexed drawings, discloses a preferred embodiment of the invention.

BRIEF DESCRIPTION OF THE DRAWINGS

The above benefits and other advantages of the various embodiments of the present invention will be more apparent from the following detailed description of exemplary embodiments of the present invention and from the accompanying figures, in which:

FIG. 14b is a bottom elevational view of the first jaw and pullback mechanism as shown in FIGS. 11-14a;

FIG. 19 is a rear elevational view of the second jaw as shown in FIGS. 17 and 18;

FIG. 20 is a front elevational view of the second jaw as shown in FIGS. 17-19;

FIG. 21a is a top plan view of the second jaw as shown in FIGS. 17-20; and

FIG. 21b is a bottom plan view of the second jaw as shown in FIGS. 17-21b.

Throughout the drawings, like reference numbers will be understood to refer to like parts, components and structures.

DETAILED DESCRIPTION OF THE INVENTION

Figure 1:
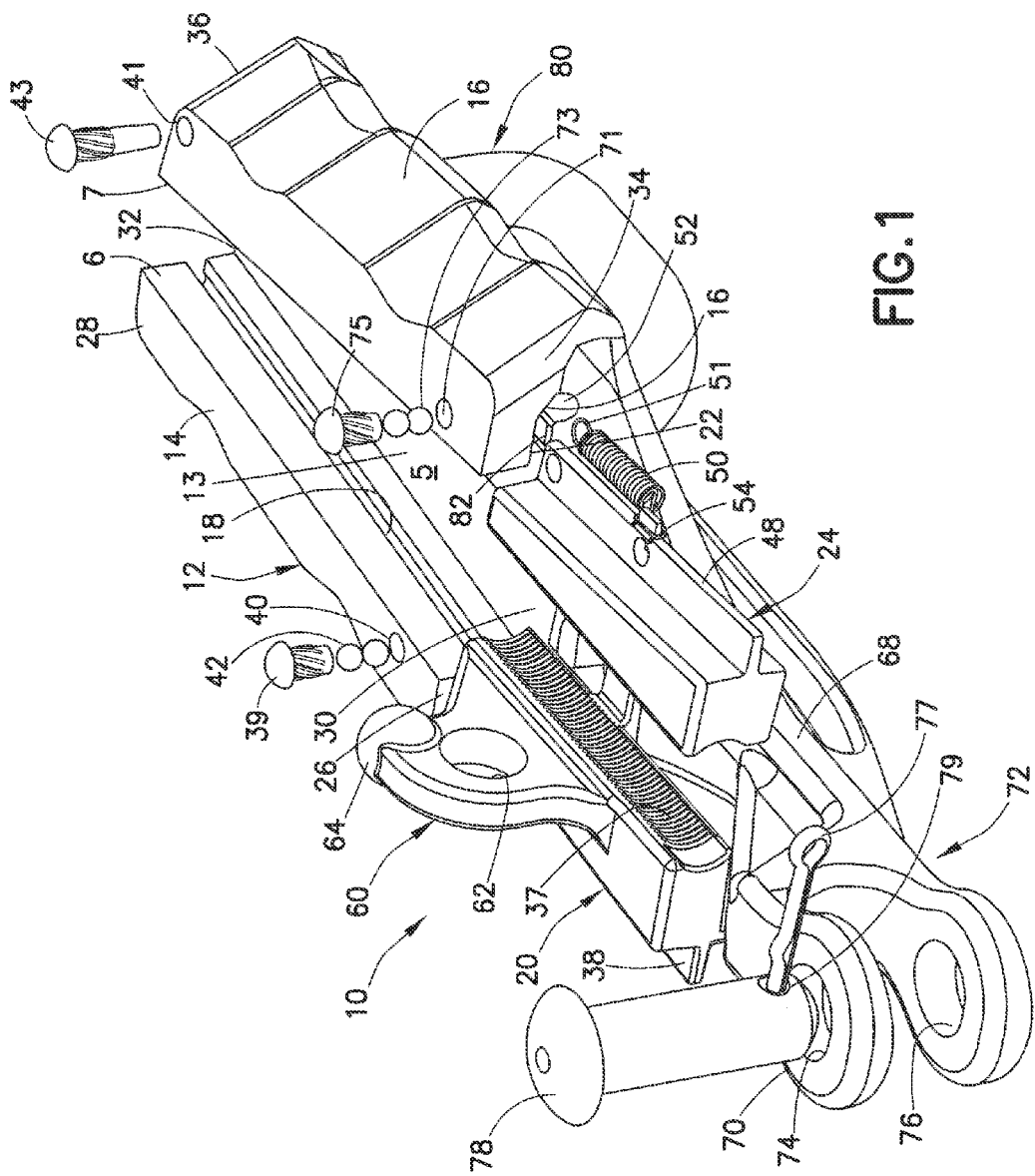
FIG. 1 is an exploded, rear perspective view of the wedge dead end clamp according to the present invention.

Turning to FIGS. 1-21b, a wedge dead end clamp assembly 10 includes a gripper body 12 having a base 13 from which first and second jaw guides 14 and 16 extend outwardly. The second jaw guide 16 faces the first jaw guide 14 and forms a trough 5 therebetween. First and second jaws 20 and 24 for receiving a cable or conductor 1 therebetween are movably received by the trough 5 of the gripper body 12. The first jaw guide 14 defines a first entry slot 18 for receiving a first jaw 20. The second jaw guide 16 defines a second entry slot 22 for receiving a second jaw 24. The jaws 20 and 24 are movable between the back end 30 of the gripper body 12 and the front end 32 of the gripper body 12. Specifically, the first jaw 20 slides from a rear end 26 of the first jaw guide 14 to a front end 28 of the first jaw guide as the second jaw 24 substantially simultaneously slides from a back end 34 of the second jaw guide 16 to a front end 36 of the second jaw guide 16.

Figure 2:
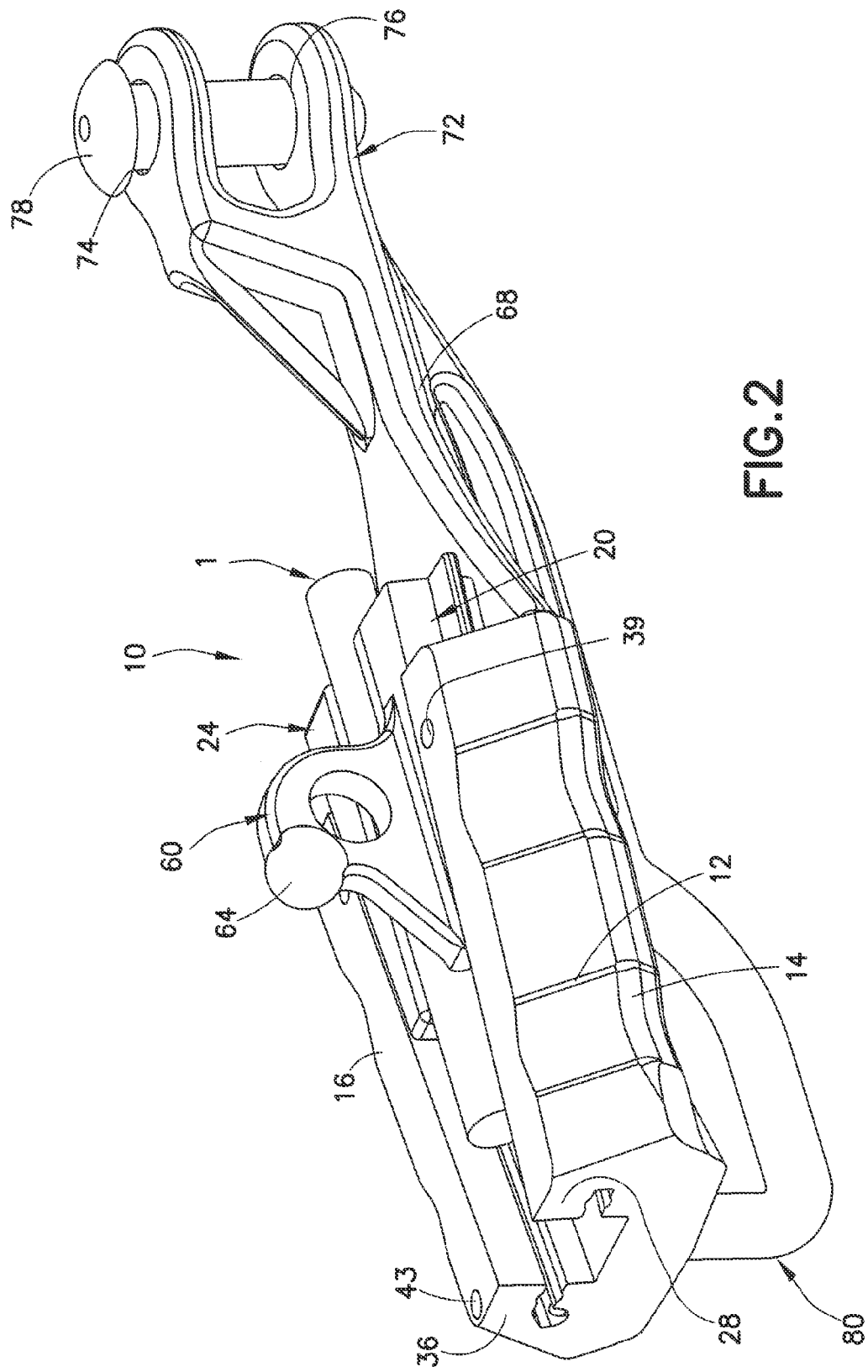
FIG. 2 is a side perspective view of the wedge dead end clamp as shown in FIG. 1 with a cable and a clevis pin received therein.
Figure 3:
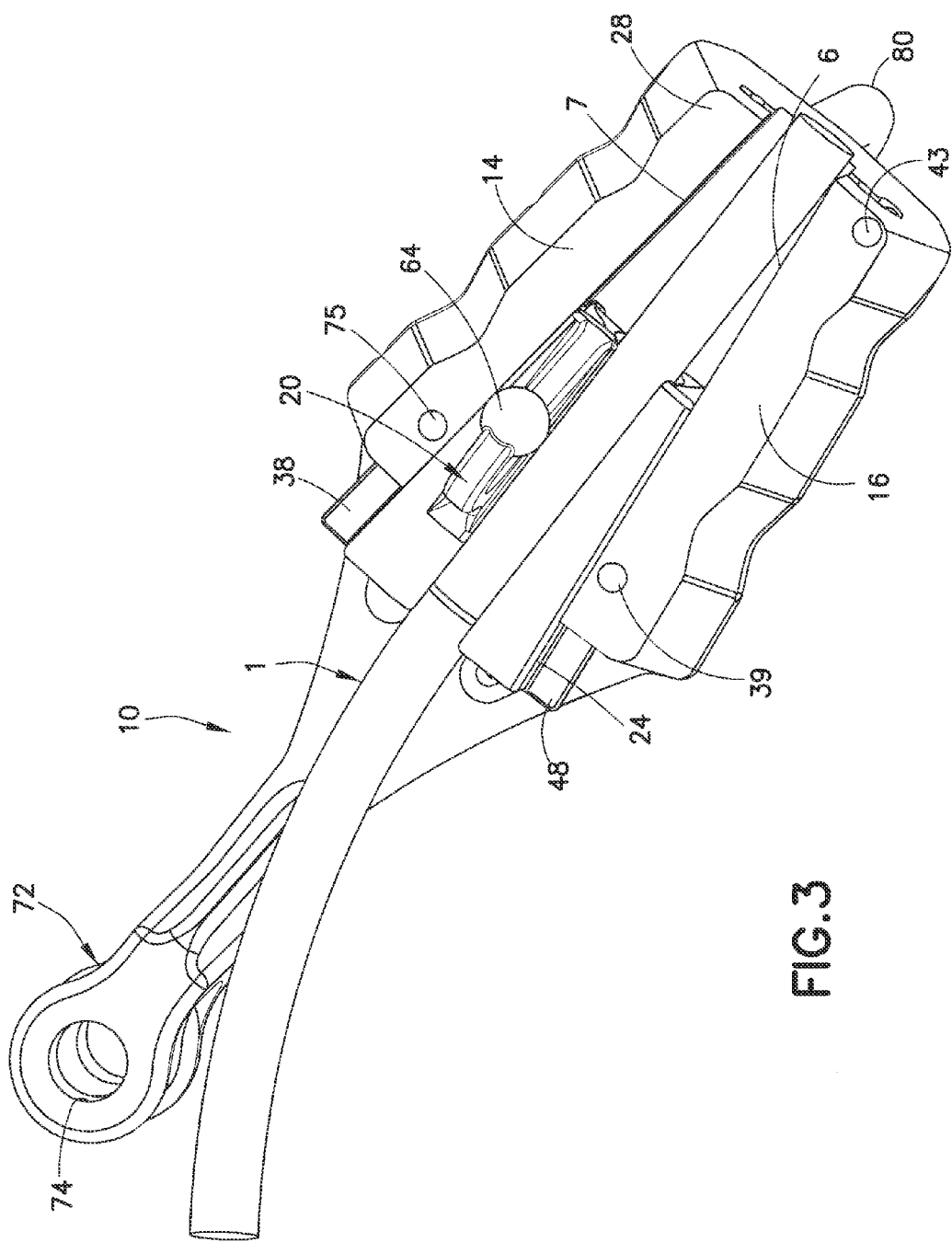
FIG. 3 is a top perspective view of the wedge dead end clamp as shown in FIGS. 1 and 2 with a cable received therein.
Figure 4A:
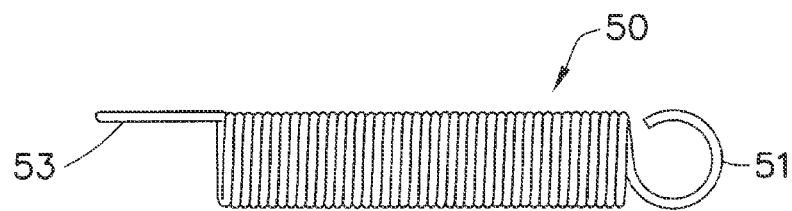
FIGS. 4a and 4b are side elevational views of a spring member.
Figure 4B:
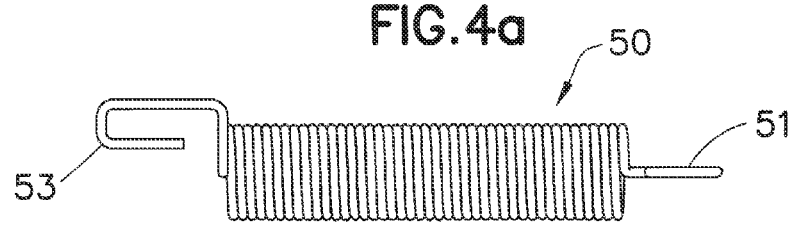

The width of a rear end 30 of the trough 5 is larger than a width at a front end 32 of the trough 5, as shown in FIGS. 1-3, and is substantially V-shaped. The inner surfaces 6 and 7 of the jaw guides 14 and 16 are angled inwardly from the rear end 26 to the front end 28 to cause the first and second jaws 20 and 24 to move together as the first and second jaws move through the trough 5 toward a rear end 30 thereof and away from each other as the jaws 20 and 24 move toward front end 32. The first entry slot 18 is formed in the inner surface 6 of the first jaw guide 14, and the second entry slot 22 is formed in the inner surface 7 of the second jaw guide 16. The first and second entry slots 18 and 22 extend from the rear end 30 to the front end 32 of the gripper body 12, as shown in FIG. 1.

Each of the first and second jaws 20 and 24 include a longitudinally extending fin 38 and 48, respectively, projecting from the main, center portion of each jaw body and received in the respective entry slots 18 and 22. Each fin 38 and 48 includes at least one circular fin opening 44 and 54, respectively, for receiving a ball bearing (described in further detail below) with respect to the interlock feature. The first and second jaws 20 and 24 also include a plurality of teeth 37 and 46, respectively, along the surfaces of the first and second jaws 20 and 24 that face the interior of the gripper body 12. The teeth 37 and 46 are used to grip the cable 1 received therebetween. As the first and second jaws 20 and 24 move from the back end 30 of the gripper body 12 toward the front end 32, the first and second jaws 20 and 24 move laterally toward one another, and the teeth 37 and 46 engage the cable 1 and enhance the grip therebetween.

Figure 9:
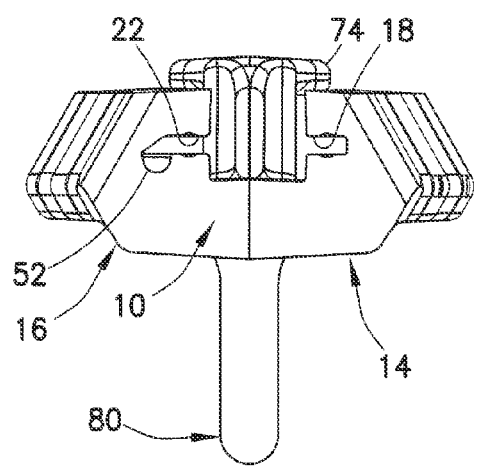
FIG. 9 is a front elevational view of the wedge dead end clamp of FIG. 6.
Figure 10:
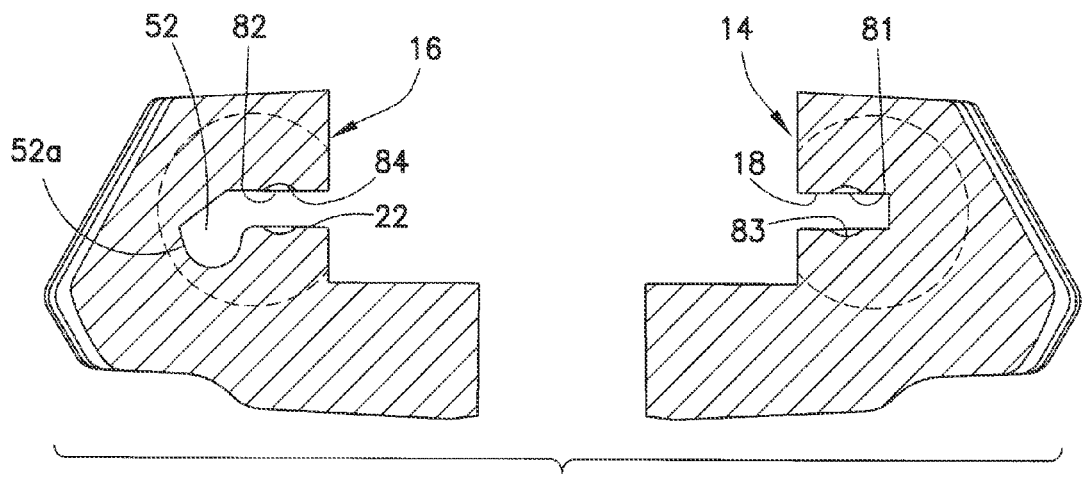
FIG. 10 is a front, cross sectional view of first and second jaw guides of the wedge dead end clamp of FIG. 6.

The second jaw guide 16 includes a key-shaped opening 52 adjacent the second entry slot 22, as shown in FIGS. 1, 9 and 10. The bulged portion 52a of the opening 52 of the second entry slot 22 receives a spring 50 loaded adjacent the second jaw 24 for biasing the jaws 20 and 24 towards the front end 32 of the gripper body 12 when the jaws are coupled by a connecting mechanism 11. The spring 50 has a first end 51 attached to a pin 43 received by an opening 41 in the second jaw guide 16. A second and opposite end 53 of the spring 50 is attached to a lateral projection, or hook, 91 extending outwardly from a fin 38 of the second jaw 24. The jaws 20 and 24 are slidably and releasably connected together, as described hereafter. The spring 50 is preferably loaded on one side of the gripper body 12, such as the side adjacent the second jaw guide 16 as shown in FIG. 1, and biases both the first and second jaws 20 and 24 forwardly when the first jaw 20 and the second jaw 24 are connected.

The first jaw 20, as shown in FIGS. 12-16, includes a pullback mechanism 60 disposed on its upper surface. The pullback mechanism 60 includes a finger opening 62 for a user's finger and a ball 64 disposed adjacent the finger opening 62. Preferably, a portion of the ball 64 is disposed above the finger opening 62. The ball 64 enhances a user's grip to facilitate retracting the first jaw 20 and pulling the first jaw toward the back end 30 of the gripper body 12.

Figure 14A:
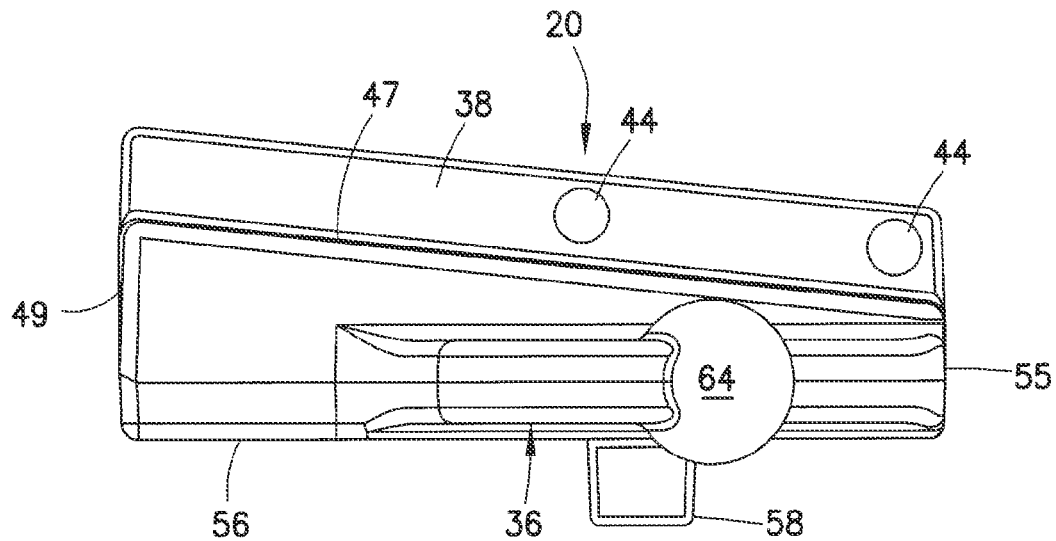
FIG. 14a is a top plan view of the first jaw and pullback mechanism as shown in FIGS. 11-13.
Figure 14B:
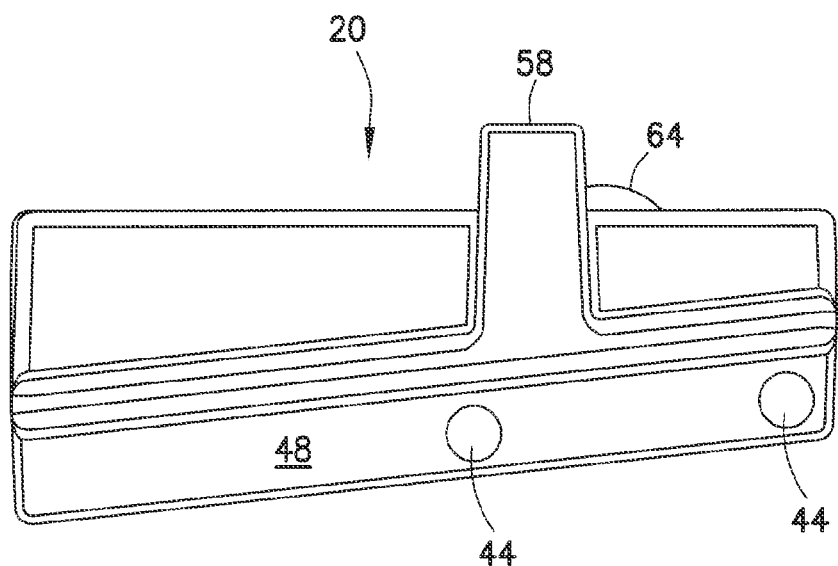
Figure 15:
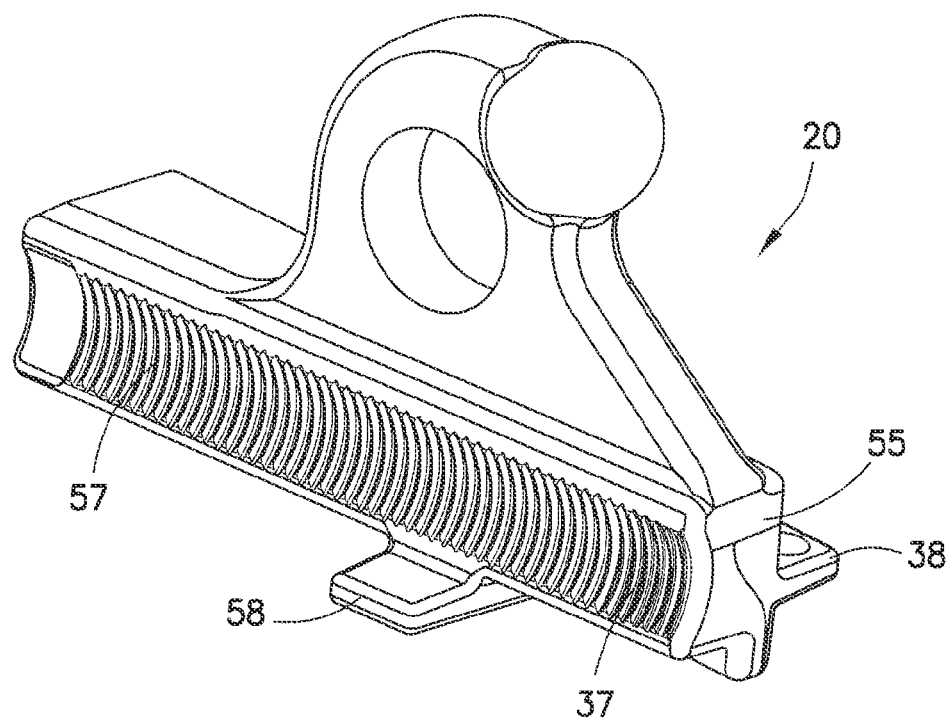
FIG. 15 is a left side perspective view of the first jaw and pullback mechanism as shown in FIGS. 11-14b.

The first fin 38 extends outwardly from an outer surface 47 of the first jaw 20, as shown in FIGS. 12-14a, 15 and 16, from a rear end 49 to a front end 55 of the first jaw 20. At least one opening 44 is formed in the first fin 38 to receive a ball bearing when the first fin 38 is received by the first entry slot 18 in the first jaw guide 14. As shown in FIG. 14a, the outer surface 47 is angled inwardly from the rear end 49 to the front end 55 of the first jaw 20, thereby facilitating movement of the first jaw 20 through the trough 5 of the gripper body 12. The outer surface 47 of the first jaw 20 has an angle substantially equivalent to that of the inner surface 7 of the second jaw 16. A cable receiving groove 57 is formed in an inner surface 56 of the first jaw 20 to receive the cable 1. Preferably, a plurality of teeth 36 are formed in the cable receiving groove 57 to facilitate gripping the cable 1. A tab 58 extends outwardly from the inner surface 57 to engage the second jaw 24, such that movement of the second jaw 24 results in movement of the first jaw 20.

The second fin 48 extends outwardly from an outer surface 59 of the second jaw 24, as shown in FIGS. 14b and 17-21b, from a rear end 63 to a front end 65 of the second jaw 24. At least one opening 54 is formed in the second fin 48 to receive a ball bearing when the second fin 48 is received by the second entry slot 22 in the second jaw guide 16. As shown in FIG. 21a, the outer surface 59 is angled inwardly from the rear end 63 to the front end 65 of the second jaw 24, thereby facilitating movement of the second jaw 24 through the trough 5 of the gripper body 12. The outer surface 59 of the second jaw 24 has an angle substantially equivalent to that of the inner surface 6 of the first jaw 14. A cable receiving groove 66 is formed in an inner surface 67 of the second jaw 24 to receive the cable 1. A recess 69 is formed in the second jaw 24, as shown in FIGS. 21a and 21b, that receives the tab 58 of the first jaw 20. A hook 91 extends outwardly from the second fin 48 and receives a second end 53 of a spring 50.

The tab 58 of the first jaw 20 and the recess 69 of the second jaw 24 form a connecting mechanism to releasably and slidably connect the first and second jaws together. The connecting mechanism is similar to the connecting mechanism described in U.S. Pat. No. 6,547,481 to Grabenstetter et al., the subject matter of which patent is hereby incorporated by reference in its entirety.

The gripper body 12 includes an interlock feature to prevent the first and second jaws 20 and 24 from sliding all the way out of the jaw guides 14 and 16. More specifically, each jaw guide 14 and 16 includes at least one opening 40 and 71, respectively, along its top surface for receiving a ball bearing 42 and 73. Preferably, the ball bearings 42 and 73 are dropped into the openings 40 and 71 of the respective jaw guides 14 and 16 and received in the circular fin openings 44 along a track of the first and second jaws 20 and 24. As the first and second jaws 20 and 24 move in the trough 5 to grip a cable 1, the ball bearings 42 are inserted through the ball bearing inserting openings 40 along the jaw guides 14 and 16 and received in the fin openings 44 along the fins 38 of the first and second jaws 20 and 24.

Figure 5:
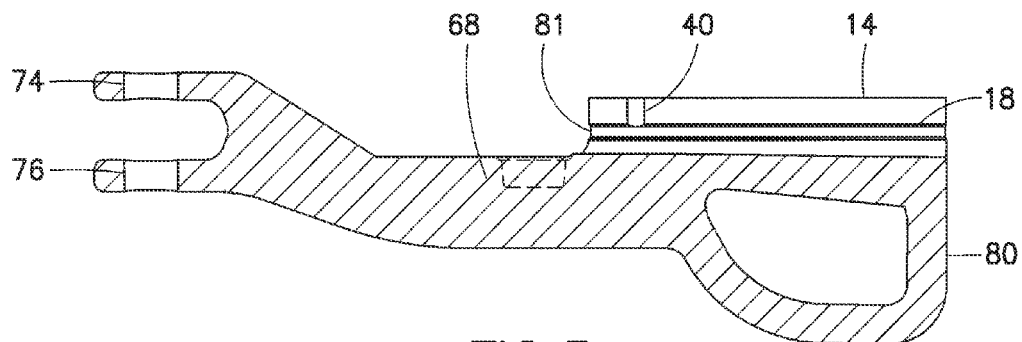
FIG. 5 is a side sectional view of the body of the wedge dead end clamp as shown in FIGS. 1-3.
Figure 6:
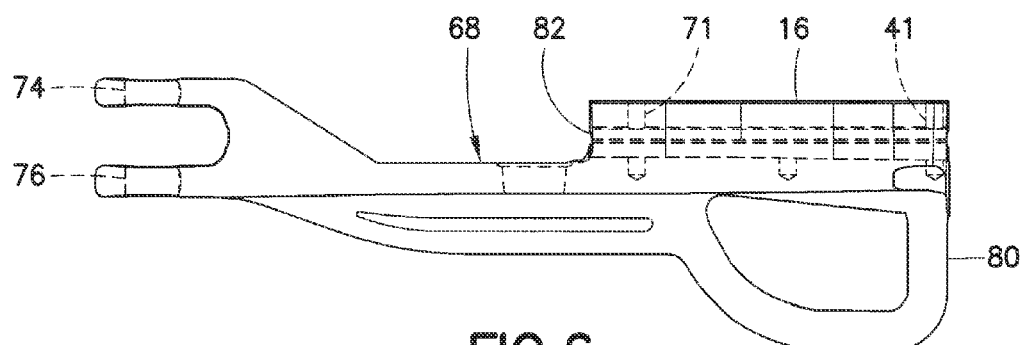
FIG. 6 is a side elevational view of the body of the dead end clamp shown in FIG. 5.
Figure 7:
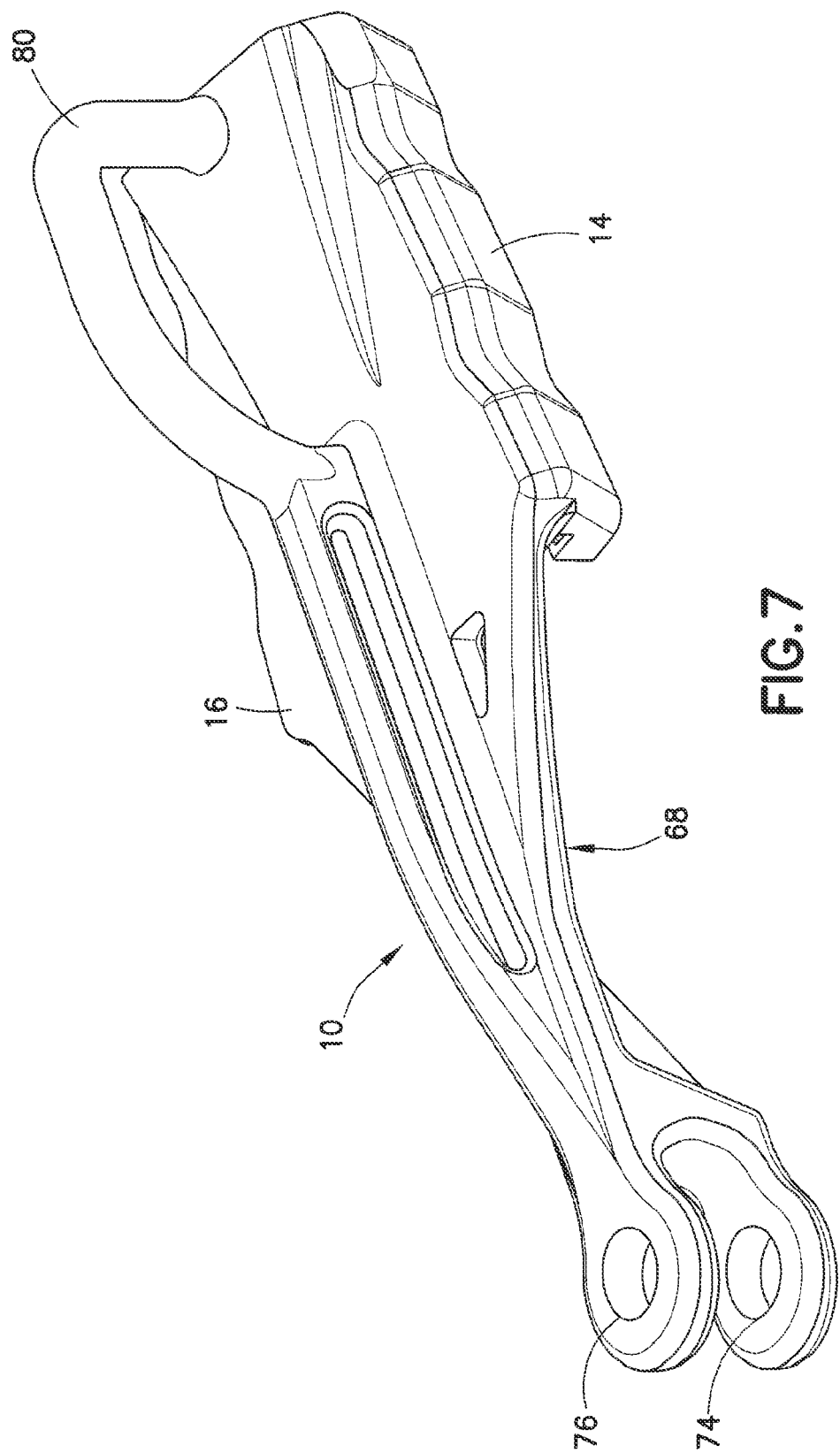
FIG. 7 is a bottom perspective view of the wedge dead end clamp as shown in FIGS. 1-3.
Figure 8:
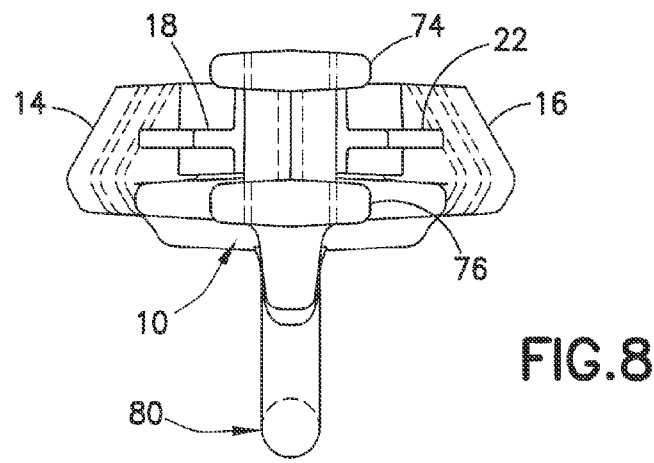
FIG. 8 is a rear elevational view of the wedge dead end clamp of FIG. 6.
Figure 10A:
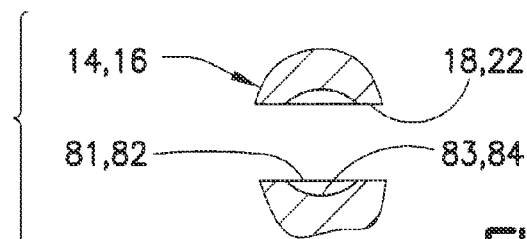
FIG. 10a is an enlarged front, cross sectional view of a stop member in an entry slot of the first jaw guide of FIG. 10.
Figure 11:
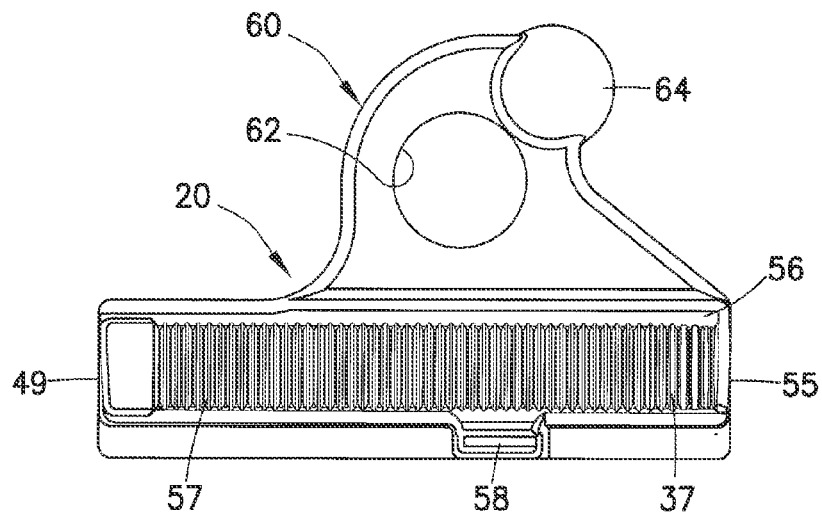
FIG. 11 is a side elevational view of the first jaw and pullback mechanism of the wedge dead end clamp as shown in FIGS. 1-3.
Figure 12:
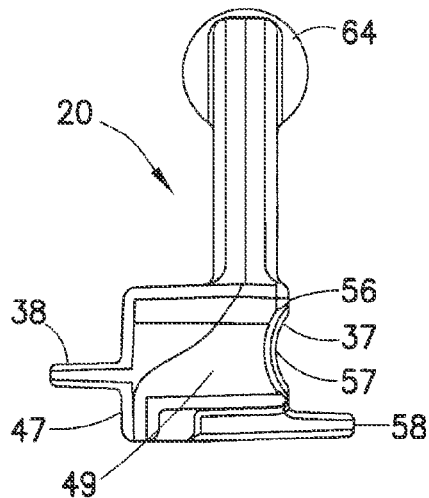
FIG. 12 is a rear elevational view of the first jaw and pullback mechanism as shown in FIG. 11.
Figure 13:
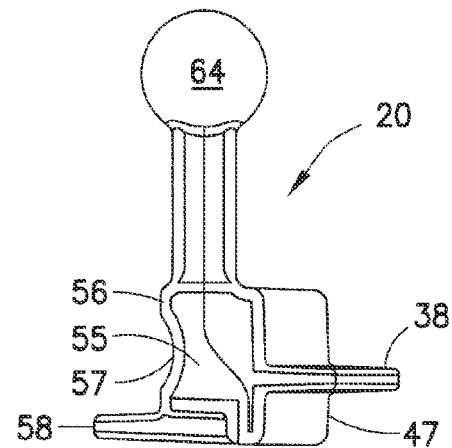
FIG. 13 is a front elevational view of the first jaw and pullback mechanism as shown in FIGS. 11 and 12.

The slots 18 and 22 of the jaw guides 14 and 16 have slightly curved longitudinally extending upper and lower surfaces 83 and 84 to accommodate and slidably receive the ball bearings 42 that extend beyond and are retained in the fin openings 44 and 54 of the first and second jaws 20 and 24. As the first and second jaws 20 and 24 slide in the jaw guides 14 and 16, the curved surfaces 83 and 84 have blocking members 81 and 82, as shown in FIGS. 5, 6 and 10, adjacent the rear end 30 to engage the ball bearings 42 and 73 to restrict withdrawal of the first and second jaws 20 and 24 from the back end 30. As shown in FIG. 10a, the blocking members 81 and 82 can be an inwardly extending wall to reduce the diameter of the curved surfaces 83 and 84 to prevent the ball bearings 42 and 73 from passing through the rear end 26 of the jaw guides 14 and 16.

Once the first and second jaws 20 and 24 are pushed towards the front end of the gripper body 12, pins 39 and 75 are inserted through openings 40 and 71 along the jaw guides 14 and 16 to further secure the ball bearings 42 in the jaw guides 14 and 16. The second jaw guide 16 includes a spring opening 41 for receiving a spring pin 43. The spring opening 41 is offset from the openings 40 for the ball bearings 42. The spring opening 41 is received in the key-shaped opening 52 of the second jaw guide 16 for securing the spring 50 therein.

The wedge dead end clamp 10 also includes a leg 68 connecting the main body 12 to the rear 70 of the wedge dead end clamp 10. The rear 70 of the wedge dead end clamp 10 includes a clevis 72 integrally extending from the leg 68. The substantially U-shaped clevis 72 includes first and second apertures 74 and 76 for receiving a bolt 78. The substantially U-shaped clevis 72 is adapted to receive a pivoted bracket or other fastening element. A cotter pin 77 is received through a cotter opening 79 disposed on the bolt 78 to secure the bolt 78 through the first and second apertures 74 and 76.

The wedge dead end clamp 10 further includes a sag eye 80 beneath the gripper body 12. The sag eye 80 is a loading tool used for relieving tension on the electrical transmission line while the cable 1 is installed between the jaws 20 and 24. Preferably, the sage eye 80 extends substantially perpendicularly from the gripper body 12.

Preferably, the gripper body 12 and the first and second jaws 20 and 24 are unitarily formed as a single piece and made of an aluminum alloy. The spring 250 is preferably made of stainless steel.

Assembly and Operation

The wedge dead end clamp assembly 10 is shown prior to engaging a cable in FIG. 1. The first jaw 20 is disposed in the trough 5 of the gripper body 12 such that the first fin 38 enters the first entry slot 18 of the first jaw guide 14. The second jaw 24 is disposed in the trough 5 of the gripper body 12 such that the second fin 48 enters the second entry slot 22 of the second jaw guide 16. The second end 53 of the spring 50 is attached to the hook 91 of the second jaw, as shown in FIG. 1.

Figure 16:
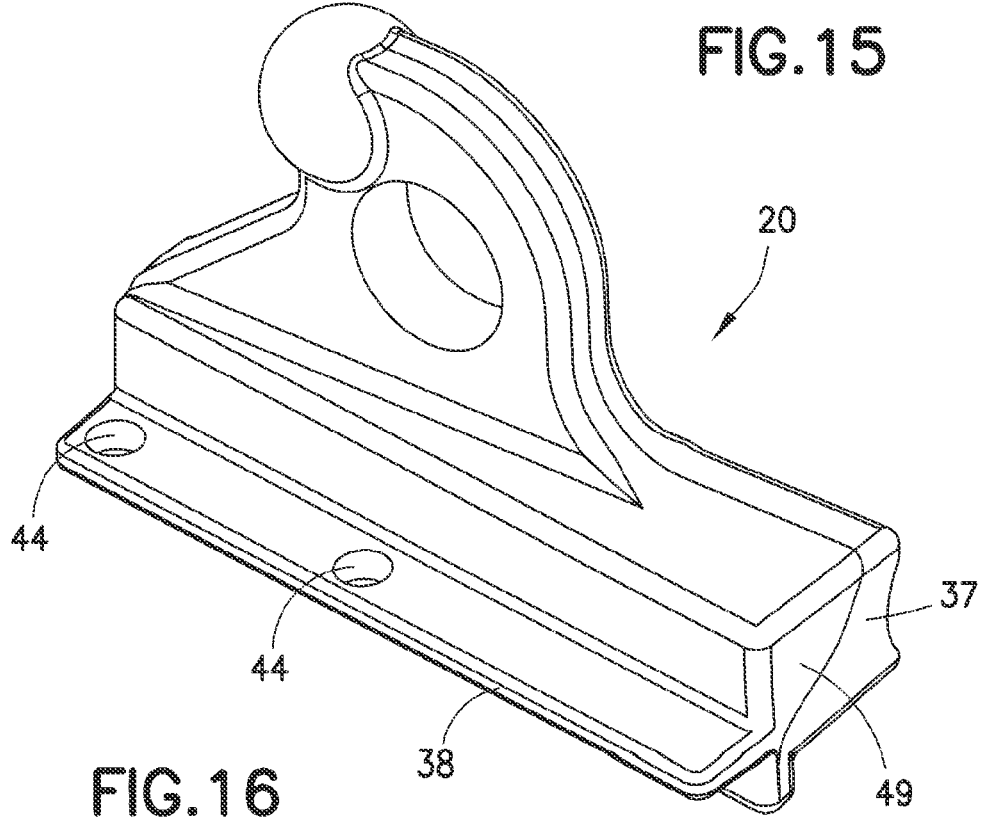
FIG. 16 is a right side perspective view of the first jaw and pullback mechanism as shown in FIGS. 11-15.
Figure 17:
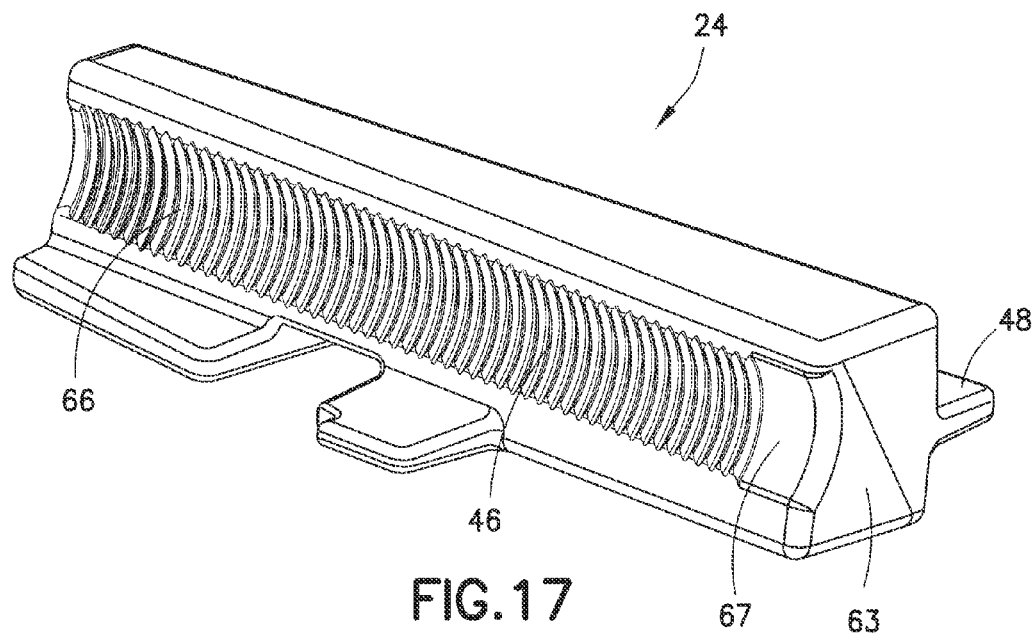
FIG. 17 is a right side perspective view of the second jaw of the wedge dead end clamp as shown in FIGS. 1-3.

The first jaw 20 is moved through the trough 5 such that the first opening 44 in the fin 38 is aligned with the opening 40 in the first jaw guide 14. A first ball bearing 42 is then dropped through the opening 40 such that it is received by the opening 44 in the first jaw 20. As shown in FIG. 16, the first jaw 20 has two openings 44 such that that first jaw 20 is moved forward through the trough 5 toward the front end 32 until the next opening 44 is aligned with the opening 40 in the first jaw guide 14. A second ball bearing 42 is then dropped through the opening 40 such that it is received by the opening 44 in the fin 38 of the first jaw 20. The pin 39 is then disposed in the opening 40 in the first jaw guide 14 to prevent the ball bearings from passing out through the opening 40. The first jaw 20 is shown having two openings 44 in the first fin 38, but any suitable number of openings can be used. The ball bearings 42 travel in the curved portion 83 of the first entry slot 18, thereby facilitating movement of the first jaw 20 through the trough 5. The stopper 81 proximal the rear end 30 of the trough 5 prevents the first jaw 20 from accidentally exiting the rear end of the first entry slot 18. As shown in FIG. 10a, the stopper 81 is an inwardly extending wall reducing the diameter of the curved portion 83 to prevent the ball bearing 42, which has a larger diameter, from exiting the entry slot 18.

Figure 18:
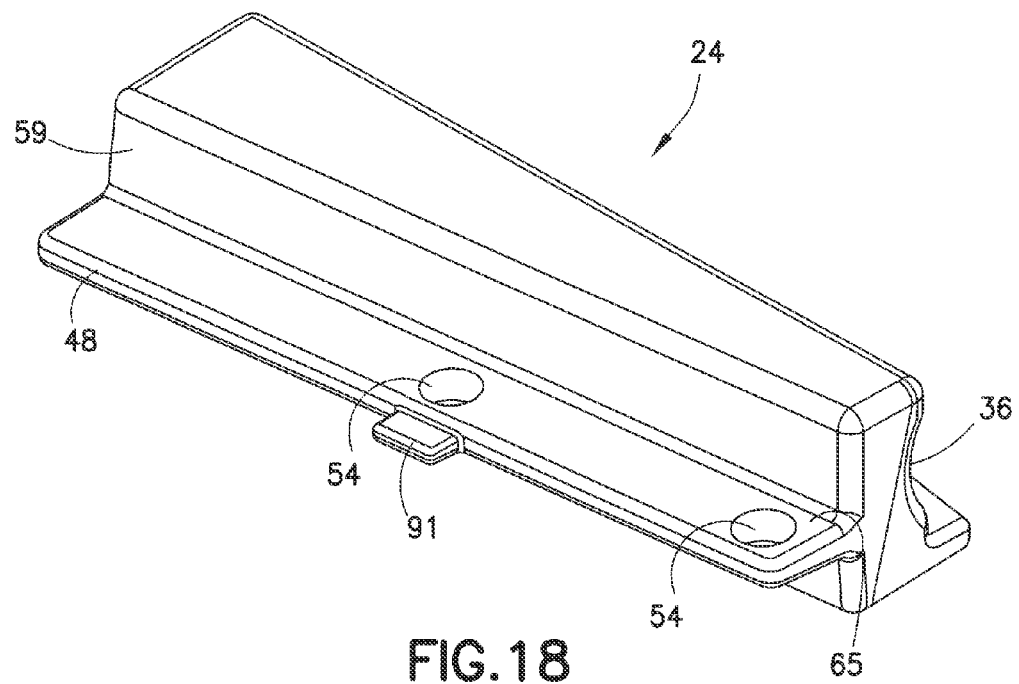
FIG. 18 is a left side perspective view of the second jaw as shown in FIG. 17.

The second jaw 24 is moved through the trough 5 such that the first opening 54 in the fin 48 is aligned with the opening 71 in the second jaw guide 16. A first ball bearing 73 is then dropped through the opening 71 such that it is received by the opening 54 in the second jaw 24. As shown in FIG. 18, the second jaw 24 has two openings 54 such that that second jaw 24 is moved forward through the trough 5 toward the front end 32 until the next opening 54 is aligned with the opening 71 in the second jaw guide 16. A second ball bearing 73 is then dropped through the opening 71 such that it is received by the opening 54 in the fin 48 of the second jaw 20. The pin 75 is then disposed in the opening 71 to prevent the ball bearings 73 from passing out through the opening 71. The second jaw 24 is shown having two openings 54 in the second fin 48, but any suitable number of openings can be used. The ball bearings 73 travel in the curved portion 84 of the second entry slot 22, thereby facilitating movement of the second jaw 24 through the trough 5. The stopper 82 proximal the rear end 30 of the trough 5 prevents the second jaw 24 from accidentally exiting the rear end of the second entry slot 22. As shown in FIG. 10a, the stopper 82 is an inwardly extending wall reducing the diameter of the curved portion 84 to prevent the ball bearing 73, which has a larger diameter, from exiting the entry slot 22.

The second jaw 24 is moved forward through the slot until the first end 51 of the spring 50 is aligned with the opening 41 in the second jaw guide 16. The spring pin 43 is inserted in the opening 41 such that it engages the hook at the first end 51 of the spring 50, which is fixed at the first end 51 to the pin 43 and at the second end 53 to the hook 91 of the second jaw 24. Preferably, the spring 50 is a pull spring to bias the first and second jaws 20 and 24 toward the front end 32 of the gripper body 12.

The cable 1 is disposed in the trough 5 of the gripper body 12 between the first and second jaws 20 and 24, as shown in FIGS. 2 and 3. The cable 1 is received by the cable engaging grooves 57 and 66 of the first and second jaws 20 and 24. The cable receiving grooves 57 and 66 preferably have a plurality of teeth 37 and 46 to facilitate gripping the cable 1. The tab 58 of the first jaw 20 engages the recess 69 in the second jaw 24 such that the first and second jaws 20 and 24 move together.

A linesman can then use a hookstick to engage the sag eye 80 to pull the wedge dead end clamp assembly 10 in a rearward direction (toward the clevis 72). This movement causes the first and second jaws 20 and 24 to move toward the front end 32 of the trough 5 of the gripper body, such that the first and second jaws also move laterally together due to the decreasing angle of the first and second jaw guides 14 and 16, as shown in FIG. 3. Movement of the first and second jaws 20 and 24 toward the front end 32 of the trough 5 is stopped when the width of the trough 5 between the first and second jaw guides 14 and 16 is substantially equal to the width of the first and second jaw members 20 and 24 and the cable 1, as shown in FIG. 3. Accordingly, a tight and secure grip between the jaws 20 and 24 and the cable 1 is created.

The wedge dead end clamp assembly 10 is then connected to a support, such as an insulator. The clevis pin 78 is passed through the apertures 74 and 76 in the clevis to secure the clamp assembly 10 to the support. A cotter pin 77 is passed through the clevis pin 78 to prevent accidental removal of the clevis pin 78 from the apertures 74 and 76.

To disengage the cable 1 from the jaws 20 and 24, a user can pull rearwardly on the pullback mechanism 60, thereby moving the jaws 20 and 24 to the rear end 30 of the trough 5 to loosen the grip on the cable 1. The ball 64 and finger opening 62 of the first jaw 20 facilitate pulling the jaws 20 and 24 rearwardly such that the clamp assembly 10 can be disengaged from the cable 1.

The foregoing embodiments and advantages are merely exemplary and are not to be construed as limiting the scope of the present invention. The description of exemplary embodiments of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A clamp assembly, comprising:
a body including a base having a front end and a rear end;
first and second jaw guides extending from said base;
a first jaw movably engaging said first jaw guide and a second jaw movably engaging said second jaw guide, said first jaw engaging said second jaw such that said first and second jaws move together; and
a pull spring member having a first end connected between said front end and said second jaw and a second end connected to said second jaw to bias said first and second jaws toward said front end.

2. The clamp assembly according to claim 1, wherein a first slot is formed in said first jaw guide to receive a first fin of said first jaw and a second slot is formed in said second jaw guide to receive a second fin of said second jaw.

3. The clamp assembly according to claim 2, wherein a third slot is connected to said second slot in said second jaw guide to receive said pull spring member.

4. The clamp assembly according to claim 2 wherein at least one ball bearing is connected to each of said first and second fins.

5. The clamp assembly according to claim 4, wherein said first and second slots have curved portions to facilitate movement of said at least one ball bearing.

6. The clamp assembly according to claim 4, wherein a stop member formed in said second slot proximal said rear end substantially prevents said second jaw from exiting said trough.

7. The clamp assembly according to claim 4, wherein each of said first and second fins has an opening therein to receive a ball bearing.

8. The clamp assembly according to claim 1, wherein a substantially spherical member is connected to said first jaw to facilitate movement of said first and second jaws toward said rear.

9. The clamp assembly according to claim 7, wherein an opening in each of said first and second jaw guides is in communication with said first and second slots to pass said at least one ball bearings to said first and second entry slots.

10. The clamp assembly according to claim 1, wherein a tab extending outwardly from said first jaw is received by a recess in said second jaw such that said first and second jaws move together.

11. The clamp assembly according to claim 1, wherein a projection extending outwardly from said second jaw receives said second end of said spring.

12. The clamp assembly according to claim 1, wherein said jaw guides are angled inwardly from said rear end to said front end.

13. The clamp assembly according to claim 1, wherein said first and second jaws have cable receiving grooves to facilitate receiving the cable.

14. A clamp assembly, comprising:
a body including a base having a front end and a rear end;
first and second jaw guides extending from said base;
a trough formed between said first and second jaw guides;
first and second jaws movably received in said trough for receiving a cable therebetween, said first jaw engaging said first jaw guide and second jaw engaging said second jaw guide; and
a pull spring member having a first end connected between said front end and said second jaw and a second end connected to said second jaw to bias said first and second jaws toward said front end.

15. The clamp assembly according to claim 14, wherein said first end of said pull spring is connected to a pin.

16. The clamp assembly according to claim 14, wherein a tab extending outwardly from said first jaw is received by a recess in said second jaw such that said first and second jaws move together.

17. A clamp assembly, comprising:

a body including a base having a front end and a rear end;

first and second jaw guides extending from said base;

a trough formed between said first and second jaw guides;

first and second jaws movably received in said trough for receiving a cable therebetween, said first jaw engaging said first jaw guide and second jaw engaging said second jaw guide; and a ball bearing retained in the first jaw guide and engaging the first jaw, wherein the first jaw guide includes a blocking member adjacent the rear end configured to retain the ball bearing.

18. The clamp assembly of claim 17, wherein said first jaw includes a fin having an opening for receiving said ball bearing.

19. The clamp assembly of claim 18, wherein said first jaw guide includes a slot having a curved portion for receiving said ball bearing.

20. The clamp assembly of claim 19, wherein a spring biases said first and second jaws toward the front end.

\* \* \* \* \*